United States Patent [19]

Corrion et al.

[11] Patent Number: 5,742,986

[45] Date of Patent: Apr. 28, 1998

[54] SEAT BELT BUCKLE WITH HALL EFFECT LOCKING INDICATOR AND METHOD OF USE

[75] Inventors: Steven G. Corrion, Oxford; Scott B. Gentry, Romeo; Brian K. Blackburn, Rochester, all of Mich.

[73] Assignees: TRW Inc.; TRW Vehicle Safety Systems Inc., both of Lyndhurst, Ohio

[21] Appl. No.: 800,263

[22] Filed: Feb. 13, 1997

[51] Int. Cl.[6] ............................. A44B 11/00; B60R 21/00
[52] U.S. Cl. ......................... 24/633; 24/303; 24/603; 24/645; 180/270
[58] Field of Search ........................... 24/633, 603, 303, 24/196, 644, 645; 180/270

[56] References Cited

U.S. PATENT DOCUMENTS

| | | |
|---|---|---|
| 3,147,819 | 9/1964 | Keleher . |
| 3,766,612 | 10/1973 | Hattori . |
| 3,770,919 | 11/1973 | Lewis . |
| 4,047,267 | 9/1977 | Lindblad . |
| 4,103,842 | 8/1978 | Martin et al. . |
| 4,785,906 | 11/1988 | Kang ........................ 180/270 |
| 5,133,425 | 7/1992 | Han ........................... 180/270 |
| 5,233,732 | 8/1993 | Yamanishi .................. 24/633 |
| 5,353,482 | 10/1994 | Ziaylek, Jr. et al. ........ 24/603 |
| 5,387,819 | 2/1995 | Ueno et al. ................ 180/270 |
| 5,406,252 | 4/1995 | Dear . |

Primary Examiner—Victor N. Sakran
Attorney, Agent, or Firm—Tarolli, Sundheim, Covell, Tummino & Szabo

[57] ABSTRACT

A seat belt buckle (12) includes a latch mechanism (20) and a Hall effect assembly (26). The latch mechanism (20) releasably interlocks with a seat belt tongue (16). The Hall effect assembly (26) has a first output if the seat belt tongue (16) is not interlocked with the latch mechanism (20) and has a second, different output if the seat belt tongue (16) is interlocked with the latch mechanism (20). The output of the Hall effect assembly (26) thus indicates whether or not the seat belt tongue (16) is interlocked with the latch mechanism (20).

13 Claims, 3 Drawing Sheets

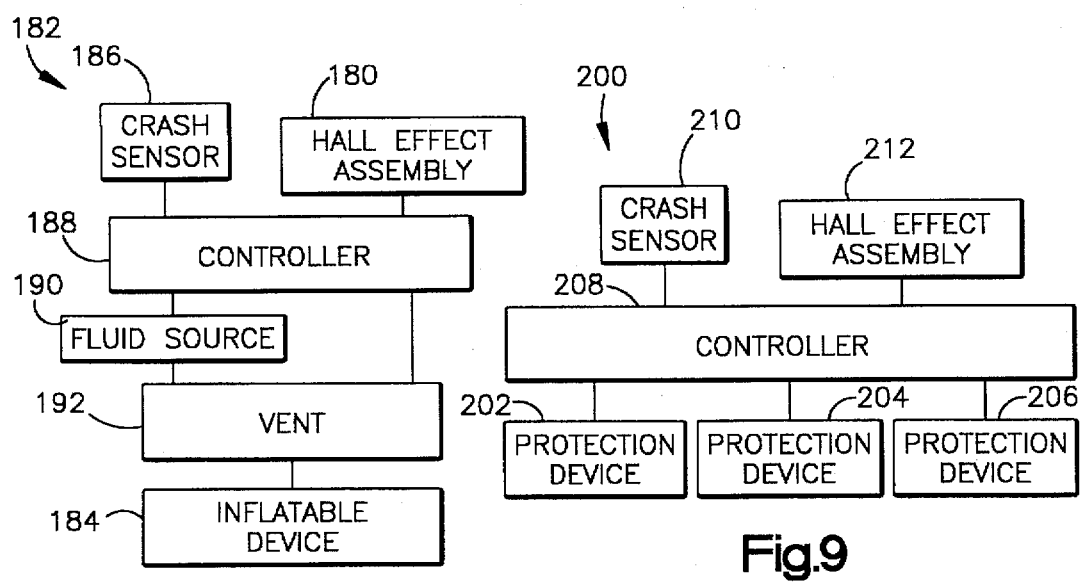
Fig.8
Fig.9
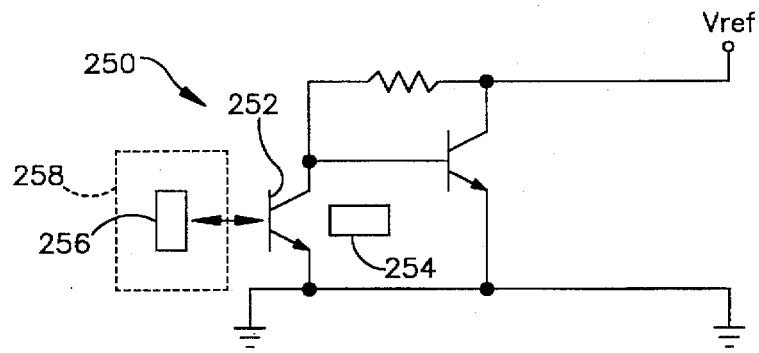
Fig.10
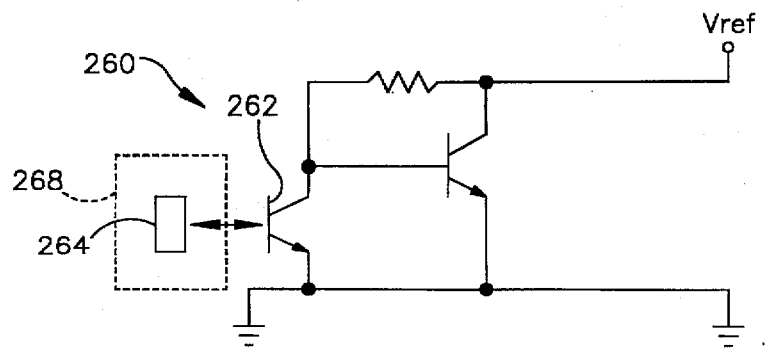
Fig.11

SEAT BELT BUCKLE WITH HALL EFFECT LOCKING INDICATOR AND METHOD OF USE

FIELD OF THE INVENTION

The present invention relates to a seat belt buckle.

BACKGROUND OF THE INVENTION

A seat belt system for restraining a vehicle occupant typically includes seat belt webbing, a seat belt locking tongue on the webbing, and a seat belt buckle. The tongue on the webbing is inserted in the buckle when the webbing has been placed about a vehicle occupant. A latch mechanism in the buckle interlocks with the tongue to secure the webbing about the occupant. Such a seat belt system may also include a buckle switch for indicating whether or not the tongue is locked in the buckle.

SUMMARY OF THE INVENTION

In accordance with the present invention, an apparatus comprises a latch mechanism and a Hall effect assembly. The latch mechanism releasably interlocks with a seat belt tongue. The Hall effect assembly has a first output if a seat belt tongue is not interlocked with the latch mechanism. The Hall effect assembly has a second, different output if a seat belt tongue is interlocked with the latch mechanism. Accordingly, the output of the Hall effect assembly indicates whether or not a seat belt tongue is interlocked with the latch mechanism.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 8 is a schematic view of a deployment system comprising a fifth embodiment of the present invention;

FIG. 9 is a schematic view of a deployment system comprising a sixth embodiment of the present invention;

FIG. 10 is a schematic view of an electrical circuit that can be used in accordance with the present invention; and FIG. 11 is a schematic view of another electrical circuit that can be used in accordance with the present invention.

DESCRIPTION OF PREFERRED EMBODIMENTS

Figure 1:
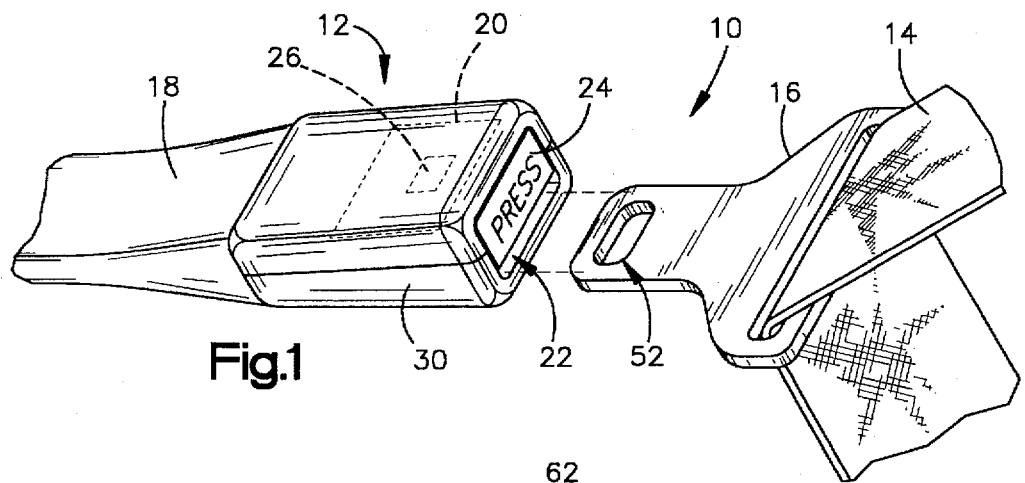
FIG. 1 is an isometric view of a vehicle occupant restraint apparatus comprising a first embodiment of the present invention.

A vehicle occupant restraint apparatus 10 comprising a first embodiment of the present invention is shown partially in FIG. 1. The apparatus 10 includes a seat belt buckle 12, seat belt webbing 14, and a seat belt tongue 16 on the webbing 14. The buckle 12 is anchored in a vehicle in a known manner, such as by a cable or anchor strap (not shown) extending within a cover 18. A latch mechanism 20 (shown schematically) locks the tongue 16 in the buckle 12 when the tongue 16 is moved into an opening 22 at the end of the buckle 12. The tongue 16 is subsequently released from the buckle 12 upon depression of a pushbutton 24 adjacent to the opening 22.

In accordance with the present invention, a Hall effect assembly 26 (also shown schematically) is located within the buckle 12. The Hall effect assembly 26 has a first output when the tongue 16 is not locked in the buckle 12 and has a second, different output when the tongue 16 is locked in the buckle 12. Accordingly, the output of the Hall effect assembly 26 indicates whether or not the tongue 16 is locked in the buckle 12.

The buckle 12 includes a housing 30. The latch mechanism 20 is contained in the housing 30, and may comprise any structure capable of releasably interlocking with the tongue 16 in cooperation with the pushbutton 24. As shown schematically by way of example in FIGS. 2–4, the latch mechanism 20 in the first embodiment of the present invention has a plurality of known parts including the pushbutton 24, an ejector 40 and a latch 42.

Figure 2:
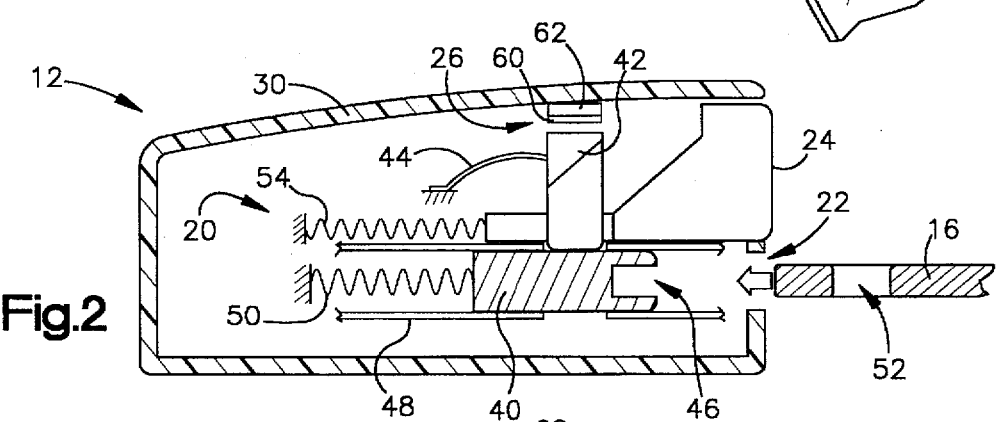
FIG. 2 is a side view, partly in section, of parts of the apparatus of FIG. 1, with certain parts being shown schematically.
Figure 3:
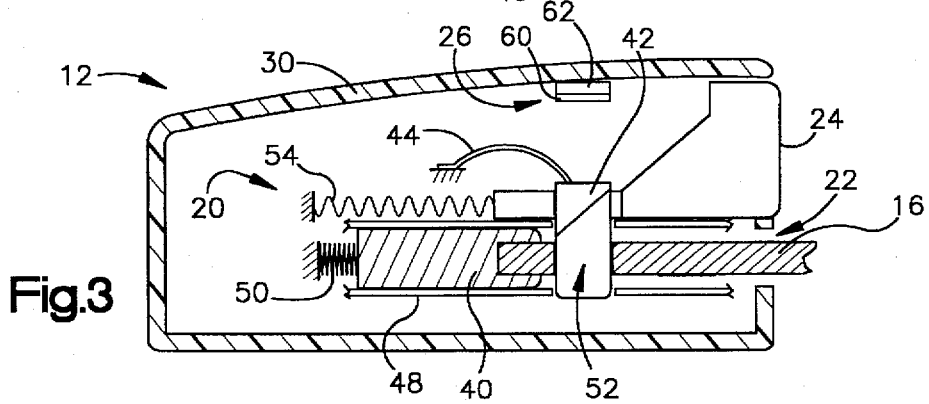
FIGS. 3 and 4 are views similar to FIG. 2 showing parts in different positions.

The latch 42, which is sometimes referred to as a locking bar, locking element, or the like, is movable between a non-locking position (FIG. 2) and a locking position (FIG. 3). When the tongue 16 is located outside the buckle 12, as shown in FIG. 2, the ejector 40 holds the latch 42 in the non-locking position against the bias of a latch spring 44.

When the tongue 16 is inserted through the opening 22, as indicated by the arrow shown in FIG. 2, it is moved into engagement with the ejector 40 in a notch 46 at the end of the ejector 40. The tongue 16 is then moved inward against the ejector 40 so as to push the ejector 40 along a guide track 48 from a forward position (FIG. 2) to a rearward position (FIG. 3) against the bias of an ejector spring 50.

As the tongue 16 and the ejector 40 approach the positions of FIG. 3, an aperture 52 in the tongue 16 moves into alignment with the latch 42. The latch spring 44 then moves the latch 42 to the locking position through the aperture 52 in the tongue 16. As a result, the latch 42 blocks removal of the tongue 16 from the buckle 12. The tongue 16 is thus interlocked with the latch mechanism 20 when the tongue 16 is moved into the buckle 12 to the position of FIG. 3.

Figure 4:
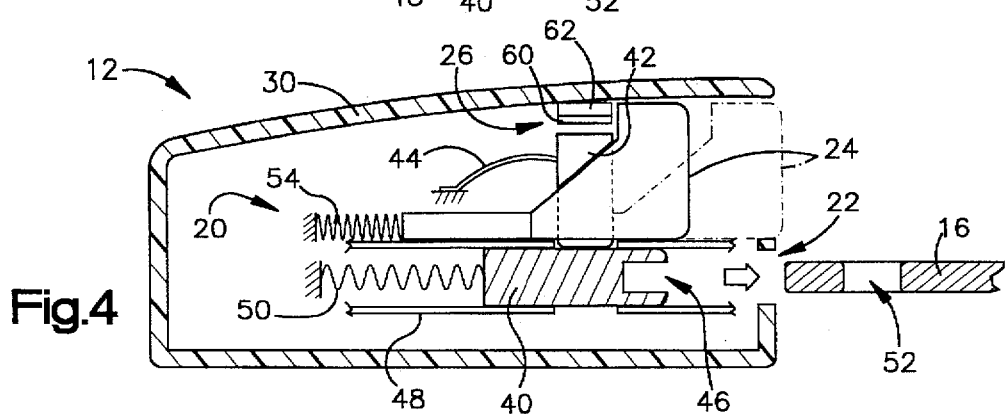

When the tongue 16 is to be released from the buckle 12, the pushbutton 24 is moved from the position of FIGS. 2 and 3 to the position of FIG. 4 against the bias of a pushbutton spring 54. The pushbutton 24 engages, or may be linked with, the latch 42 in a known manner so as to move the latch 42 back out of the aperture 52 in the tongue 16 against the bias of the latch spring 44. The ejector spring 50 then moves the ejector 40 back outward along the guide track 48 toward the opening 22 to eject the tongue 16 from the buckle 12.

As shown schematically in FIGS. 2–4, the Hall effect assembly 26 includes a Hall effect device 60, and further includes a source 62 of a magnetic field which energizes the Hall effect device 60. The Hall effect device 60 in the first embodiment of the present invention is a differential Hall effect integrated circuit (IC) including a Hall transistor, and may have any suitable structure known in the art. The field source 62 in the first embodiment is a permanent magnet. The output of the Hall effect IC 60 is determined by the flux density of the magnetic field provided by the magnet 62.

Any suitable mounting board, mounting bracket or the like (not shown) can be used to support the Hall effect assembly 26 in the housing 30 at the location shown in FIG. 2.

When the latch 42 is in the non-locking position of FIG. 2, it is closely spaced from the magnet 62. The latch 42, which is formed of a magnetic or ferromagnetic material, then has a first effect on the flux density of the magnetic field at the location of the Hall effect IC 60. The Hall effect IC 60 is then energized by the magnetic field so as to have a first predetermined condition with a first predetermined output.

When the latch 42 has been moved to the locking position of FIG. 3 upon locking of the tongue 16 in the buckle 12, it is spaced farther from the magnet 62. The latch 42 then has a correspondingly lesser effect on the flux density of the magnetic field at the location of the Hall effect IC 60. The Hall effect IC 60 is then energized by the magnetic field so as to have a second predetermined condition with a second, correspondingly different output. The output of the Hall effect IC 60 thus indicates whether or not the tongue 16 is locked in the buckle. Importantly, the Hall effect IC 60 is switched between the first and second conditions by varying the flux density of the magnetic field so that the locked or unlocked condition of the tongue 16 is indicated in accordance with the present invention without the use of input from a device that contacts the tongue 16 or the latch 42.

Figure 5:
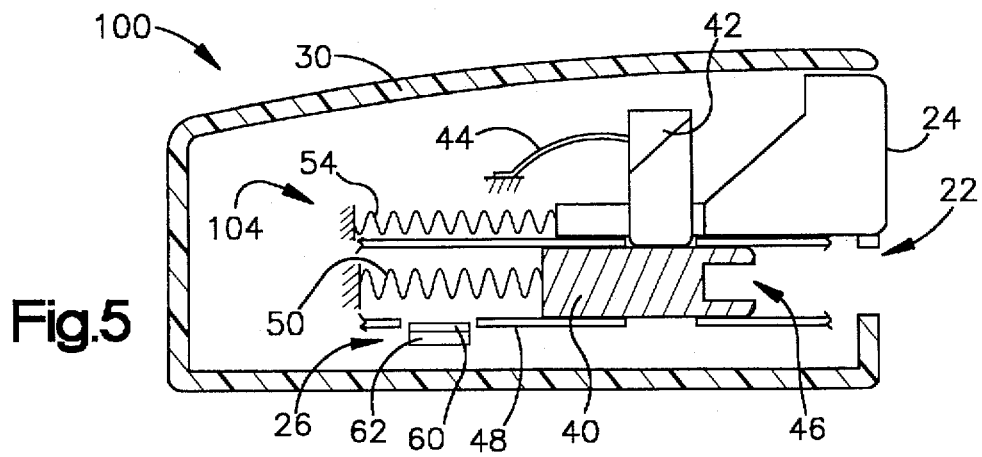
FIG. 5 is a view similar to FIG. 2 showing parts of a vehicle occupant restraint apparatus comprising a second embodiment of the present invention.

A second embodiment of the present invention is shown partially in FIG. 5. The second embodiment includes a buckle 100 with many parts that are substantially the same as corresponding parts of the buckle 12. This is indicated by the use of the same reference numbers for such corresponding parts of the buckles 100 and 12. The buckle 100 thus has a housing 30 containing a latch mechanism 20 and a Hall effect assembly 26 including a Hall effect IC 60 and a permanent magnet 62. However, the Hall effect assembly 26 in the buckle 100 is mounted in the housing 30 at a location adjacent to the ejector 40 rather than the latch 42.

The ejector 40 in the buckle 100 has a forward position, as shown in FIG. 5, and has a rearward position corresponding to the rearward position of the ejector 40 shown in FIG. 3. Moreover, the ejector 40 in the buckle 100 is formed of a magnetic or ferromagnetic material. Accordingly, when the ejector 40 in the buckle 100 is in the forward position of FIG. 5, it is spaced from the magnet 62 so as to have a first predetermined effect on the flux density of the magnetic field at the location of the Hall effect IC 60. When the ejector 40 in the buckle 100 has been moved to its rearward position, it is closer to the magnet 62 and thus has a second, correspondingly greater effect on the flux density of the magnetic field at the location of the Hall effect IC 60. As a result, the Hall effect IC 60 in the buckle 100 has a first energized condition with a first output when a corresponding tongue is located outside of the buckle 100, and has a second, differently energized condition with a second, correspondingly different output when the ejector 40 has been moved to the rearward position upon locking of a tongue in the buckle 100.

Figure 6:
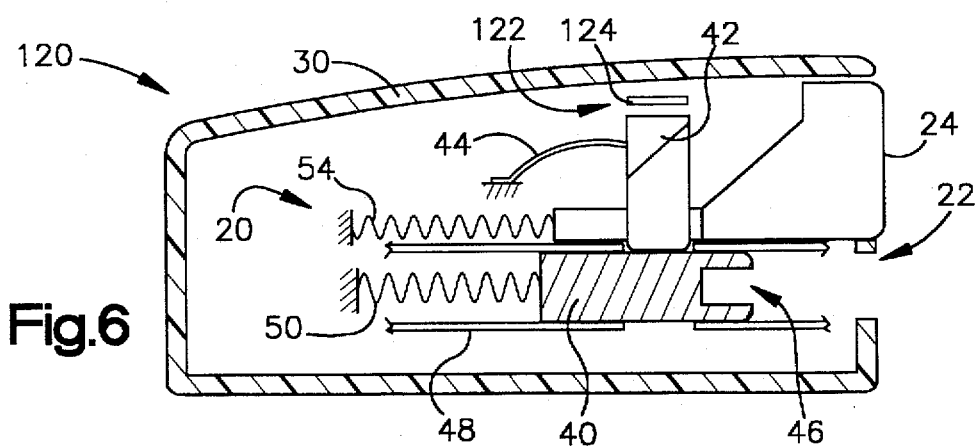
FIG. 6 is a view similar to FIG. 2 showing parts of a vehicle occupant restraint apparatus comprising a third embodiment of the present invention.

As shown partially in FIG. 6, a third embodiment of the present invention includes a seat buckle 120. As indicated by further use of the same reference numbers, the buckle 120 of FIG. 6 has parts that are substantially the same as corresponding parts of the buckle 100 of FIG. 5. However, the buckle 120 has an alternative Hall effect assembly 122 which differs from the Hall effect assembly 26. The Hall effect assembly 122 comprises a differential Hall effect IC 124 like the IC 60, but does not include a permanent magnet like the magnet 62. Instead, the latch 42 in the buckle 100 is a permanent magnet which provides a magnetic field for energizing the Hall effect IC 124.

When the latch 42 in the buckle 120 is in the non-locking position of FIG. 6, it is spaced from the Hall effect IC 124 such that the flux density of the magnetic field has a first value at the location of the Hall effect IC 124. The Hall effect IC 124 then has a first energized condition with a first output. When the latch 42 in the buckle 120 has been moved to a locking position (corresponding to the locking position of the latch 42 shown in FIG. 3), it is spaced farther from the Hall effect IC 124. The flux density of the magnetic field at the location of the Hall effect IC 124 then has a second, lesser value, and the Hall effect IC 124 has a second, differently energized condition with a correspondingly different output.

Figure 7:
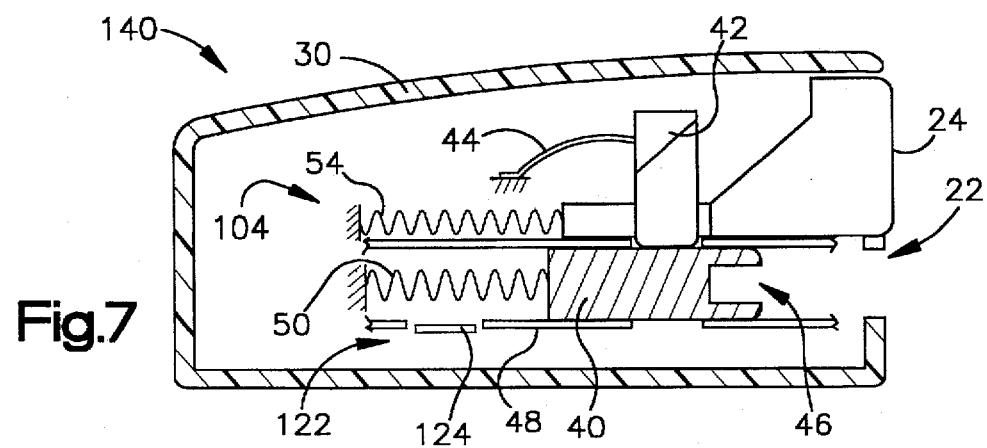
FIG. 7 is a view similar to FIG. 2 showing parts of a vehicle occupant restraint apparatus comprising a fourth embodiment of the present invention.

As shown in FIG. 7, a fourth embodiment of the present invention includes a seat belt buckle 140 with many parts that are substantially the same as corresponding parts of the buckle 120. Those parts include a Hall effect assembly 122 comprising a differential Hall effect IC 124. The Hall effect IC 124 in the buckle 140 has a location similar to the location of the Hall effect IC 60 in the buckle 100 of FIG. 5. In the buckle 140, the ejector 40 is a permanent magnet which switches the Hall effect IC 124 between first and second predetermined conditions upon moving between its forward and rearward positions.

Each Hall effect assembly described above can be used in accordance with the present invention to alert a vehicle occupant to the locked or unlocked condition of the corresponding tongue and buckle. For example, an audible alarm or a lamp on the vehicle instrument panel could be activated in response to the output of the Hall effect assembly to alert a vehicle occupant if the tongue is not locked in the buckle.

A Hall effect assembly can also be used in accordance with the present invention to control deployment of one or more vehicle occupant protection devices. For example, as shown schematically in the block diagram of FIG. 8, a Hall effect assembly 180 in a fifth embodiment of the present invention is included in a deployment system 182 with an inflatable vehicle occupant protection device 184. The Hall effect assembly 180 provides an output indicating whether or not a tongue is locked in a corresponding buckle (not shown) in the same manner as any one of the Hall effect assemblies described above. The deployment system 182 further includes a crash sensor 186, a controller 188, and a source 190 of inflation fluid. A vent 192 is interposed between the source 190 of inflation fluid and the inflatable device 184.

The inflatable device 184 can be any one of several different types of inflatable vehicle occupant protection devices known in the art. Such inflatable devices include, for example, air bags, inflatable seat belts, inflatable knee bolsters, inflatable head liners, and knee bolsters operated by air bags.

The crash sensor 186 may comprise any known apparatus for sensing a vehicle condition that indicates the occurrence of a crash. The crash-indicating condition may comprise, for example, sudden vehicle deceleration that is caused by a crash. If the crash-indicating condition is at or above a predetermined threshold level, it indicates the occurrence of a crash or other event for which deployment of the inflatable device 184 is desired to help protect an occupant of the vehicle. The crash sensor 186 then provides a deployment signal to the controller 188.

When the controller 188 receives a deployment signal from the crash sensor 186, it responds by actuating the fluid source 190 to initiate inflation of the inflatable device 184. The controller 188 further responds to the output of the Hall effect assembly 180 by operating the vent 192 in accordance with the locked or unlocked condition of the corresponding tongue and buckle. If the output of the Hall effect assembly 180 indicates that the tongue is not locked in the buckle, the controller 188 causes the vent 192 to direct a first amount of inflation fluid away from the inflatable device 184. The inflatable device 184 is then deployed in a first mode for protection of a vehicle occupant who is not being restrained by the corresponding seat belt webbing. If the output of the Hall effect assembly 180 indicates that the tongue is locked in the buckle, the controller 188 causes the vent 192 to direct a second, different amount of inflation fluid away from the inflatable device 184. The inflatable device 184 is then deployed in a second, different mode for protection of a vehicle occupant who is being restrained by the seat belt webbing.

A sixth embodiment of the present invention is shown partially in the block diagram of FIG. 9. The sixth embodiment comprises another example of a deployment system that can be operated in differing modes in accordance with the present invention. The sixth embodiment thus comprises a deployment system 200 for a plurality of vehicle occupant protection devices 202, 204 and 206. In addition to the protection devices 202, 204 and 206, the deployment system 200 includes a controller 208, a crash sensor 210, and a Hall effect assembly 212 in accordance with the present invention. Like the Hall effect assemblies described above, the Hall effect assembly 212 provides a first output when a seat belt tongue is not locked in a corresponding buckle and provides a second, different output when a seat belt tongue is locked in the buckle.

Each of the protection devices 202, 204 and 206 can be an inflatable device, a seat belt pretensioner, a seat belt retractor lock, or any other device that is deployed for protection of a vehicle occupant. When the controller 208 receives a deployment signal from the crash sensor 210, it deploys one or more of the protection devices 202, 204 and 206 in a first mode if the Hall effect assembly 212 provides the first output. The controller 208 deploys one or more of the protection devices 202, 204 and 206 in a second, different mode if the Hall effect assembly 212 provides the second output.

Each mode of deployment for the protection devices 202, 204 and 206 may comprise simultaneous or sequential deployment of the protection devices 202, 204 and 206 with a predetermined timing. Each mode of deployment may alternatively comprise deployment of less than all of the protection devices 202, 204 and 206. For example, if the protection devices 202, 204, and 206 include a pretensioner, a retractor lock, or another device that functions to help control tension in the seat belt webbing, it may be preferable not to deploy that device if the Hall effect assembly 212 indicates that the tongue is not locked in the buckle. Moreover, if the protection devices 202, 204 and 206 include an inflatable device, each mode of deployment may comprise the use of one or more vents like the vent 192 described above with reference to FIG. 8. The first and second deployment modes could also differ from each other by the use of a fluid source that operates in different stages to provide inflation fluid in correspondingly different amounts (with or without venting) or at correspondingly different times, and/ or by providing multiple sources of inflation fluid which are operative selectively.

FIG. 10 is a schematic view of an electrical circuit 250 that can be used in the manner described above with reference to the first and second embodiments of the present invention. The circuit 250 includes a Hall transistor 252 located between a permanent magnet 254 and a magnetic part 256 of a latch mechanism 258. The latch mechanism 258 moves the magnetic part 256 toward and away from the magnet 254 upon locking and unlocking of a seat belt tongue in a corresponding buckle, as indicated by the arrow shown in FIG. 10. When the magnetic part 256 is moved toward and away from the magnet 254 in this manner, it varies the flux density of the magnetic field acting on the Hall transistor 252 to switch the Hall transistor 252 between first and second predetermined conditions having first and second predetermined outputs in accordance with the present invention.

FIG. 11 is a schematic view of an electrical circuit 260 that can be used in the manner described above with reference to the third and fourth embodiments of the present invention. The circuit 260 includes a Hall transistor 262 located adjacent to a movable magnet 264. The magnet 264 is part of a latch mechanism 268, and is moved relative to the Hall transistor 262 upon interlocking of a seat belt tongue with the latch mechanism 268. The latch mechanism 268 thus varies the flux density of the magnetic field acting on the Hall transistor 262 to switch the Hall transistor 262 between first and second predetermined conditions having first and second predetermined outputs in accordance with the present invention.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a latch mechanism which releasably interlocks with a seat belt tongue; and
   a Hall effect assembly which has a first output if a seat belt tongue is not interlocked with said latch mechanism and a second, different output if a seat belt tongue is interlocked with said latch mechanism,
   said Hall effect assembly including a Hall effect device and a source of a magnetic field which energizes said Hall effect device,
   said latch mechanism including a magnetic part having a first position with a first effect on the flux density of said magnetic field and a second position with a second, different effect on said flux density,
   said magnetic part moving from one of said positions to the other of said positions upon interlocking of a seat belt tongue with said latch mechanism.

2. Apparatus as defined in claim 1 wherein said magnetic part is a latch.

3. Apparatus as defined in claim 1 wherein said magnetic part is an ejector.

4. Apparatus comprising:
   a latch mechanism which releasably interlocks with a seat belt tongue; and
   a Hall effect assembly which has a first output if a seat belt tongue is not interlocked with said latch mechanism and a second, different output if a seat belt tongue is interlocked with said latch mechanism,
   said Hall effect assembly including a Hall effect device and a source of a magnetic field which energizes said Hall effect device,
   said latch mechanism moving said source relative to said Hall effect device to vary the flux density of said magnetic field upon interlocking with a seat belt tongue.

5. Apparatus as defined in claim 4 wherein said source is a magnetized part of said latch mechanism.

6. Apparatus as defined in claim 5 wherein said magnetized part of said latch mechanism is a latch.

7. Apparatus as defined in claim 5 wherein said magnetized part of said latch mechanism is an ejector.

8. Apparatus comprising:

a seat belt buckle including a housing containing a latch mechanism which releasably locks a seat belt tongue in said buckle;

a Hall effect device in said housing;

a source of a magnetic field which energizes said Hall effect device; and switch means for varying the flux density of said magnetic field so as to switch said Hall effect device between first and second predetermined conditions in response to locking of a seat belt tongue in said buckle, said switch means comprising a magnetic part having a first position with a first effect on said flux density and a second position with a second, different effect on said flux density, said Hall effect device switching between said first and second conditions upon movement of said magnetic part between said first and second positions.

9. Apparatus as defined in claim 8 wherein said magnetic part is a part of said latch mechanism.

10. Apparatus as defined in claim 9 wherein said magnetic part is a latch.

11. Apparatus as defined in claim 9 wherein said magnetic part is an ejector.

12. A method comprising the steps of:

varying the flux density of a magnetic filed acting on a Hall effect device so as to switch said Hall effect device between first and second predetermined conditions in response to locking of a seat belt tongue in a seat belt buckle, said Hall effect device having a first output when in said first condition and has a second, different output when in said second condition; and operating a deployment means for deploying a vehicle occupant protection device in response to a predetermined vehicle condition, said deployment means being operated in a first mode in response to said first output in a second, different mode in response to said second output.

13. A method as defined in claim 12 wherein said deployment means deploys said protection device when operating in said first mode and does not deploy said protection device when operating in said second mode.

* * * * *